US010298759B1

(12) United States Patent
Ross et al.

(10) Patent No.: US 10,298,759 B1
(45) Date of Patent: May 21, 2019

(54) CONTACT CENTER USER AUTHENTICATION

(71) Applicant: Eckoh UK Limited, Hemel Hempstead, Hertfordshire (GB)

(72) Inventors: Cameron Peter Sutherland Ross, St. Albans (GB); James Heath, Hove (GB); Ashley Burton, Watford (GB)

(73) Assignee: Eckoh UK Limited, Hemel Hempstead (GB)

( * ) Notice: Subject to any disclaimer, the term of this patent is extended or adjusted under 35 U.S.C. 154(b) by 0 days.

(21) Appl. No.: 16/193,028

(22) Filed: Nov. 16, 2018

(30) Foreign Application Priority Data

Jul. 25, 2018 (GB) .................................. 1812151.7

(51) Int. Cl.
*H04M 3/51* (2006.01)
*H04L 29/08* (2006.01)

(52) U.S. Cl.
CPC .......... *H04M 3/5183* (2013.01); *H04L 67/02* (2013.01); *H04L 67/146* (2013.01); *H04L 67/20* (2013.01); *H04M 2203/6045* (2013.01)

(58) Field of Classification Search
CPC ........ H04M 3/5138; H04M 2203/6045; H04L 67/02; H04L 67/146; H04L 67/00
USPC .................................................. 379/265.09
See application file for complete search history.

(56) References Cited

U.S. PATENT DOCUMENTS

| 9,059,971 B2 * | 6/2015 | Graham | .............. H04L 63/0428 |
| 9,143,922 B2 * | 9/2015 | Veneroso | .............. H04W 12/06 |
| 2015/0281234 A1 | 10/2015 | Sylvain | |

FOREIGN PATENT DOCUMENTS

GB          2547885 A    9/2017

* cited by examiner

Primary Examiner — Quynh H Nguyen
(74) Attorney, Agent, or Firm — Blank Rome LLP

(57) ABSTRACT

A method comprising: establishing a first session with a user; determining a unique identifier of the first session; generating a session identifier to identify the first session and storing it in a cache in association with the unique identifier; outputting an address and the session identifier, for delivery to the user; receiving an authentication request transmitted to the address from the user's first device, and in response, outputting a message to the first device, the message comprising the session identifier and an address at which a request for authentication by an authentication service can be directed; receiving an authentication success message comprising the session identifier and indicating authentication of the user; establishing a second session with a service agent; and in response to receiving the message, querying the cache with the session identifier to determine the unique identifier, and connecting the first and second sessions together using the unique identifier.

21 Claims, 5 Drawing Sheets

CONTACT CENTER USER AUTHENTICATION

FIELD OF THE INVENTION

The present invention relates to a method and system for user authentication, in particular, a method and system for authenticating a contact center user.

BACKGROUND OF THE INVENTION

Customers may interact with contact centers in order to purchase items offered for sale by a particular merchant. A new customer is usually required to provide personal details to a contact center agent, who in turn registers the customer on the merchant's ordering system. This personal information typically includes the customer's name and home address, but can include other elements such as credit card details, billing address, and email address. Such personal information can be relatively time-consuming to collect. For example, capturing a home address verbally may take 30 seconds.

Typical authentication methods used by contact center operators include asking the customer to confirm personal details, a password or some other personal secret which has been shared with the contact center operator in the past.

Contact centers may use the caller line identification (CLI, or number from which the customer is calling), to partially authenticate the customer. Contact centers may also use voice biometrics to check whether the current caller's voice profile matches that sampled during previous interactions. To do so requires an initial 'registration' process on the initial call with a customer.

Outside of a contact center environment, for example for online e-commerce purchases, customers are willing to provide their personal details such as credit card numbers and billing addresses, to online payment systems. The largest online payment providers store hundreds of millions of their customers' payment details. Such storage aids customers in future purchases—they do not need to repeat the provision of personal information to each new merchant or for each transaction.

Online payment providers have well-established methods for ensuring customers are authenticated correctly prior to each transaction. Such methods typically involve the entry of a password to an online form, or, increasingly, the complex analysis of a customer's IP address, browser profile, location, previous payment history, and other factors.

Such authentication methods are typically very quick. Several online payment (or 'wallet') providers provide "frictionless" login or authentication methods if a customer's relevant data (such as location, IP address, etc.) have not changed since their last successful authentication or purchase.

However, online authentication methods have not been applied to contact center interactions.

SUMMARY OF THE INVENTION

Call duration is usually of critical importance for the operator of a contact center. Using a contact center agent to authenticate a new or returning customer impacts call duration. There is a direct link between call duration and the two largest typical costs in this environment: labour and telephony. Contact center operators therefore try to ensure that call duration is minimised, if possible.

It is also vitally important to capture a customer's personal details free of error. If not, the contact center operator, or merchant on whose behalf the contact center is being operated, may incur on-costs. For example, if a merchant delivers an order to the wrong address, the cost of rectification may be substantial.

In addition, contact center operators are typically focused on ensuring that new and repeat customers are correctly authenticated prior to the commencement of a call. If contact center operators cannot be sure of a customer's identity, the chances of fraudulent transactions or mistakes in an order are higher.

It is with these considerations in mind that aspects of the present disclosure have been developed.

The inventors have recognized that on the internet, the use of existing trusted authentication methods can aid account creation, and is popular with consumers. For example, instead of asking a new user to populate name, address, email address, etc, as part of a sign-up process, a merchant may offer a quick alternative: sign up using an existing PayPal® or Amazon® account profile.

In such cases, the user consents to sharing some of their personal information between (say) PayPal and the merchant. The merchant receives relevant information, but the user does not need to disclose their password or other security credentials.

Open standards for this so-called "secure delegated access" also exist—one being OAuth. Here, all communication between user, merchant and account provider is through HTTP.

However, such cases have yet to be applied to contact center login or account creation. This is understandable, as there is no mechanism for communicating using HTTP over a telephone channel.

The inventors have recognized that a need exists to combine the online secure delegated access approach with contact center communications. In particular, a need exists to accurately capture information for new contact center customers, to authenticate returning customers, and to do so with minimum impact on call duration, by incorporating online authentication methods to contact center customers.

According to one aspect of the present disclosure there is provided a method of authenticating a user and connecting the authenticated user to a service agent, the method comprising, at at least one server: establishing a first communication session with the user; determining a unique identifier associated with the first communication session; generating a session identifier to identify said first communication session and storing said session identifier in a data cache coupled to said server in association with the unique identifier; outputting an address and the session identifier, for delivery to the user; receiving an authentication request transmitted to said address from a first computing device associated with said user, and in response, outputting at least one message to the first computing device, the at least one message comprising the session identifier and an address at which a request for authentication by an authentication service can be directed; receiving an authentication success message comprising the session identifier, the authentication success message indicating successful authentication of the user with the authentication service, said authentication success message output by the authentication service; establishing a second communication session with a service agent; and in response to receiving the message indicating successful authentication of the user, querying the data cache with the session identifier to determine the unique identifier associated with the first communication session, and connecting the first communication session and the second communication sessions together using the unique identifier associated with the first communication session.

Such an approach reduces call handling time while maintaining a level of quality of service, accurately captures information of new contact center customers and ensures that a customer (e.g. telephone caller) is correctly authenticated (they are who they say they are).

The first communication session may be established with the first computing device.

The address and session identifier may be output using a device identifier to the first computing device or a further computing device associated with the user.

The device identifier may be associated with the first computing device, and the method may further comprise automatically detecting the device identifier during the first communication session.

The first communications session may be established with a communications device associated with the user.

The address and session identifier may be output using a device identifier to the first computing device, the communications device associated with the user, or a further computing device associated with the user. The method may further comprise outputting a message requesting said device identifier during the first communication session and receiving the device identifier in reply, from the user, during the first communication session.

The address and the session identifier may be output to the user via a communication channel associated with the first communications session.

The address and session identifier may be output using a user identifier of the user. The method may further comprise outputting a message requesting said user identifier during the first communication session and receiving the user identifier in reply, from the user, during the first communication session.

The unique identifier may be one of: (i) a telephony session identifier assigned to the first communication session; (ii) timestamp indicating when the first communication session was established; (iii) a phone number associated with the user; and (iv) a channel number of a telephone line used to establish the first communication session, wherein the telephone line is one of a plurality of telephone lines provided by the at least one server.

The authentication success message may be received from (i) the first computing device, or (ii) the authentication service.

The service agent may be a contact center agent or an interactive voice response system.

The outputting at least one message to the first computing device may comprise serving a webpage to the first computing device, wherein said webpage includes a user selectable element which when selected causes a request for authentication to be transmitted from the first computing device to the authentication service.

The authentication success message may additionally comprise user information associated with the user.

The method may further comprise establishing a third communication session with the authentication service, and during the third communication session: transmitting a request for user information associated with said user to the authentication service, and in reply receiving user information associated with said user.

The method may further comprise outputting the user information to a server associated with a merchant.

The method may further comprise, in response to said connecting, retrieving user information associated with the user from said server and supplying the retrieved user information to the service agent.

The first communication session may be a voice call, and the second communication session may comprise a voice call.

According to another aspect of the present disclosure there is provided a computer program product for authenticating a user and connecting the authenticated user to a service agent, the computer program product comprising instructions embodied on a non-transient computer-readable medium and configured so as when executed on a processor of at least one server to perform any of the method steps described herein.

The instructions (code) may be provided on a carrier such as a disk, CD- or DVD-ROM, programmed memory such as read-only memory (Firmware), or on a data carrier such as an optical or electrical signal carrier. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

According to another aspect of the present disclosure there is provided a server for authenticating a user and connecting the authenticated user to a service agent, the server comprising a processing apparatus configured to: establish a first communication session with the user; determine a unique identifier associated with the first communication session; generate a session identifier to identify said first communication session and storing said session identifier in a data cache coupled to said server in association with the unique identifier; output an address and the session identifier, for delivery to the user; receive an authentication request transmitted to said address from a first computing device associated with said user, and in response, outputting at least one message to the first computing device, the at least one message comprising the session identifier and an address at which a request for authentication by an authentication service can be directed; receive an authentication success message comprising the session identifier, the authentication success message indicating successful authentication of the user with the authentication service, said authentication success message output by the authentication service; establish a second communication session with a service agent; and in response to receiving the message indicating successful authentication of the user, query the data cache with the session identifier to determine the unique identifier associated with the first communication session and connect the first communication session and the second communication session together using the unique identifier associated with the first communication session.

These and other aspects will be apparent from the embodiments described in the following. The scope of the present disclosure is not intended to be limited by this summary nor to implementations that necessarily solve any or all of the disadvantages noted.

BRIEF DESCRIPTION OF DRAWINGS

For a better understanding of the present subject matter and to show how the same may be carried into effect, reference will now be made by way of example to the accompanying drawings in which.

DETAILED DESCRIPTION

Specific embodiments will now be described, by way of example only.

Figure 1:
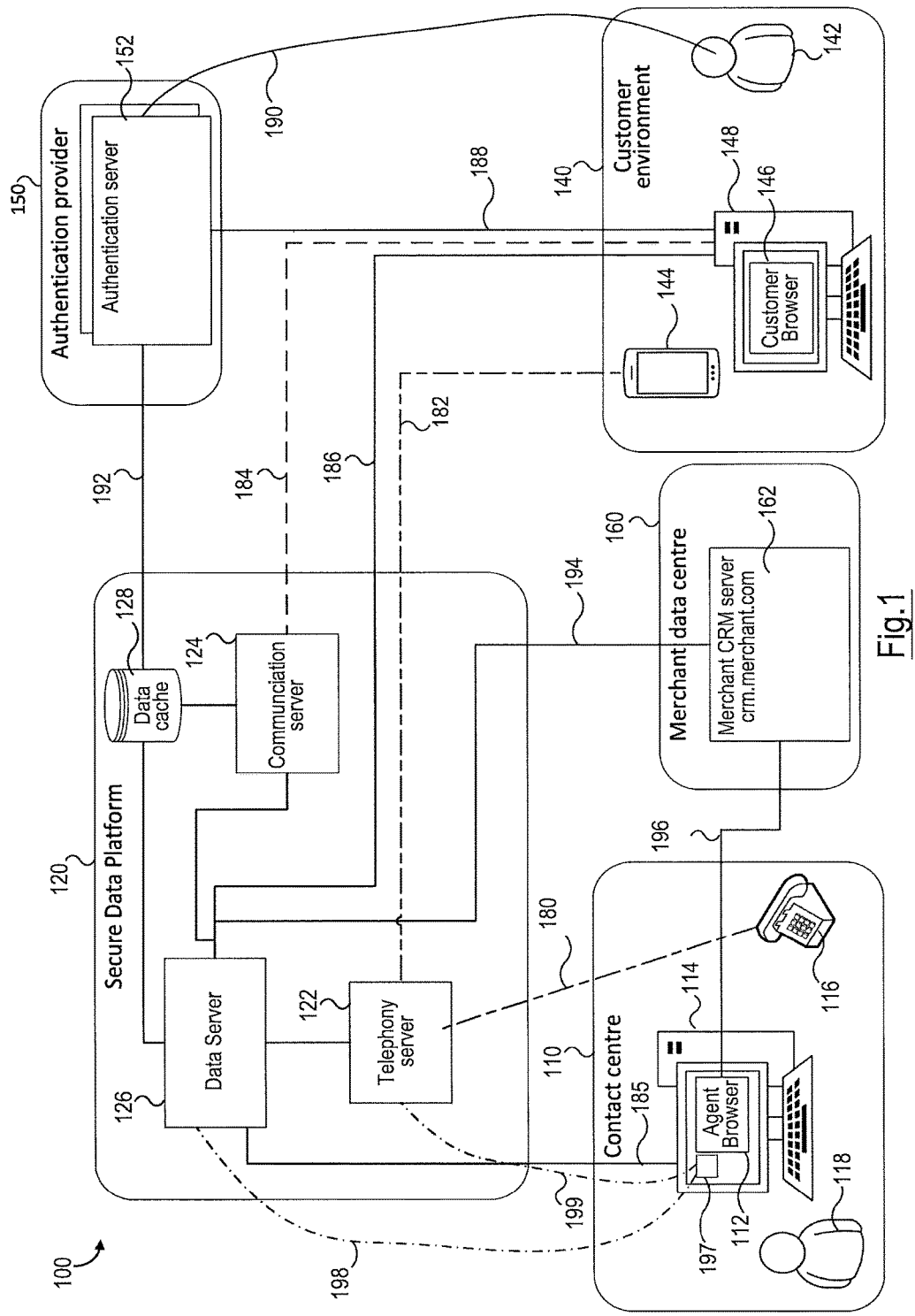
FIG. 1 shows a schematic block diagram of a system in which a customer communicates with a contact center over a telephone call, according to one described embodiment.

FIG. 1 shows a schematic diagram of a system 100 in which a customer 142 having communications device 144 wishes to be connected to a service agent 118 in a merchant's contact center 110, to request goods or a service offered by a company (merchant). The term 'customer' is used herein to refer to a person requesting goods or services offered by the company (merchant).

FIG. 1 also shows a secure data platform (SDP) 120 comprising a data server 126, a telephony server 122, a communication server 124, and a data cache 128. As shown in FIG. 1, the data server 126 is coupled to the telephony server 122, the communication server 124 and the data cache 128. The SDP 120 is operated by or on behalf of the merchant. Whilst each of these servers is shown as a single entity in FIG. 1 and referred to herein, it will be appreciated that a plurality of servers may perform the operations described herein with reference to a single server. Similarly, it will be appreciated that whilst a single data cache 128 is shown in FIG. 1, multiple data caches may be provided.

As shown in FIG. 1, the data server 126, telephony server 122, communication server 124 and data cache 128 are shown as separate and distinct devices, though it will be appreciated that the functionality of one or more of these devices may be incorporated within one or more of the other devices.

The communications device 144 may for example be a mobile telephone as shown in FIG. 1, or a fixed landline telephone, a VOIP telephone, or a smart home assistant device such as Amazon Alexa® or Google Home™. That is, the communications device 144 may communicate with the telephony server 122 via a communication channel 182 which may be over a PSTN network, cellular network, and/or a packet based network (e.g. the Internet) in the case of a Voice over Internet Protocol (VOIP) call.

As shown in FIG. 1, the customer 142 may be associated with a computing device 148 executing a customer application 146. The customer application 146 may be a web browser, an executable application (e.g. an 'app'), or similar. For simplicity, hereafter we will refer to the customer application 146 as a browser. The computing device 148 may be PC, laptop, tablet or any other computing device able to connect to a secure data platform (SDP) 120 referred to below.

The communication server 184 has a communication channel 184 to the customer environment 140. The communication channel 184 may be over a PSTN network, cellular network, and/or a packet based network (e.g. the Internet) in the case of a Voice over Internet Protocol (VOIP) call. Whilst FIG. 1 shows the communication channel 184 being between the communication server 124 and the computing device 148, this is merely an example and alternatively or additionally, the communication channel 184 may be between the communication server 124 and the communications device 144 and/or a further computing device (not shown in FIG. 1 for simplicity) e.g. a home 'smart assistant' such as their Amazon Alexa® or Google Home™ device.

The data server 126 has a connection 186 to the customer browser 146, which is shown in FIG. 1 as being executed on the computing device 148.

As will explained in more detail below, the communications device 144 may execute the customer browser 146 and therefore it will be appreciated that it is not necessary for the customer 142 to use multiple devices in embodiments described herein (e.g. when the communications device 144 is a smart mobile telephone).

The data server 126 is coupled to a merchant customer relationship management (CRM) server 162 at a merchant data center 160 via a communication channel 194, which may be via a packet-based network (e.g. the Internet).

FIG. 1 also shows an authentication provider 150, operating one or more authentication servers 152. A shown in FIG. 1, the data server 126 is coupled to the authentication server 152 via a communications channel 192 which may be via a packet-based network (e.g. the Internet). Although FIG. 1 shows the authentication provider 150 operating external to the secure data platform 120, it will be appreciated that the authentication provider 150 and authentication servers 152 may be incorporated within the secure data platform 120, or indeed in any other location (such as within the merchant data center 160).

The customer browser 146 is configured to communicate with the authentication server 152 over channel 188 which may be via a packet-based network (e.g. the Internet). The user may communicate with the authentication server 152 using one or more 'out of band' communication channels 190 between the authentication server 152 and the customer 142. The communication channel 190 between authentication server 152 and customer 142, may be to the customer's mobile device 144, or to another device or endpoint not shown in FIG. 1. A combination of communication channel 188 and 'out of band' communication channel(s) 190 may be used by the customer 142 when interacting with the authentication server 152 in an authentication process which is described in detail below (e.g. in a two-factor authentication process). Communications between the customer 142 and the authentication server 152 may also pass through the secure data platform 120, or through other servers not shown in FIG. 1.

As shown in FIG. 1 in the contact center 110 a service agent 118 may be associated with an agent computing device 114 executing an agent browser 112, and an agent phone 116. The service agent 118 may be a person located in the contact center 110. Alternatively, the role of the service agent may be fulfilled, partly or completely, by an autonomous or semi-autonomous process executed on the computer 114 or elsewhere in the contact center 110, or outside the contact center 110. Such autonomous or semi-autonomous approaches, such as using Interactive Voice Response (IVR), are well known to those skilled in the art, and may allow contact centers to deploy center agent resources more efficiently, to improve customer service, or reduce cost.

The data server 126 has a data connection 185 to the agent browser 146. The agent browser is coupled to the merchant CRM server 162 via communication channel 196. The agent phone 116 may communicate with the telephony server 122 via a communication channel 180 which may be over a PSTN network, cellular network, and/or a packet-based network (e.g. the Internet) in the case of a Voice over Internet Protocol (VOIP) call.

The data server 126 may also have a computer telephony integration (CTI) link 198 to a CTI application 197 executed on the agent computer 114. Similarly, the telephony server 122 may have a CTI link 199 to the CTI application 197. The CTI application 197 enables a service agent 118 to take an action (e.g. answer call, transfer call etc.) with respect to a phone connection established on communication channel 180.

Figure 2:
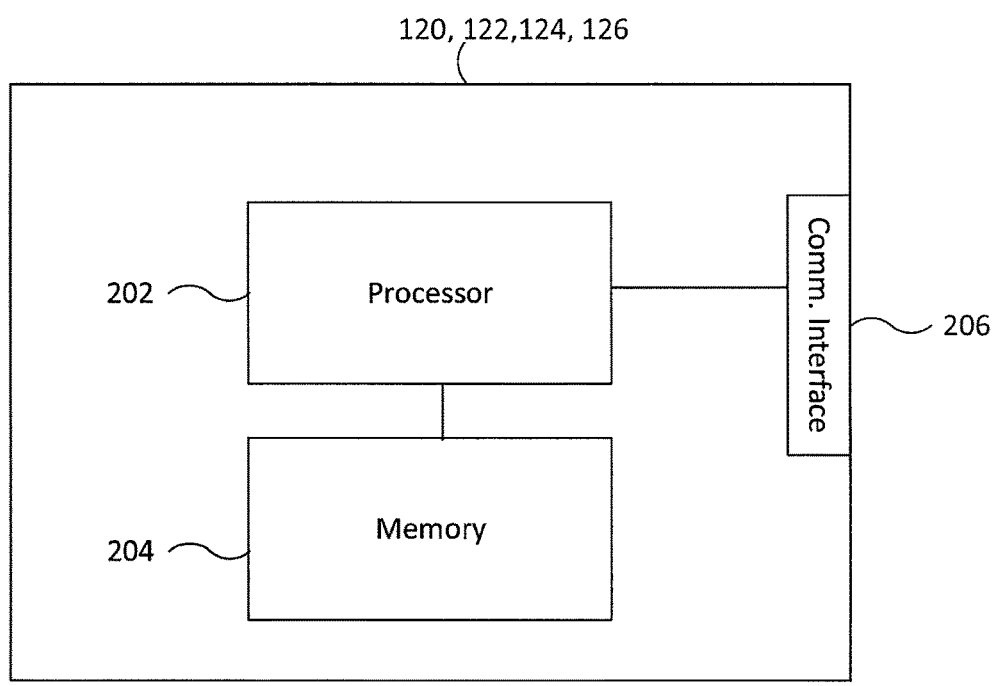
FIG. 2 shows a schematic block diagram of a server in the system of FIG. 1.

FIG. 2 shows a schematic block diagram of a server in the system 100 of FIG. 1.

The server shown in FIG. 2 may for example correspond to one of the data server 126, telephony server 122, and the communication server 124 described herein. Alternatively, the server shown in FIG. 2 may for example correspond to a server comprising the functionality of the data server 126, telephony server 122, and the communication server 124 described herein.

The functionality of the server may be implemented in code (software) stored on a memory (e.g. memory 206) comprising one or more storage media, and arranged for execution on the processor 202 comprising on or more processing units. The code is configured so as when fetched from the memory 204 and executed on the processor 202 to perform operations in line with embodiments discussed below. Alternatively, it is not excluded that some or all of the functionality of the server is implemented in dedicated hardware circuitry, or configurable hardware circuitry like an FPGA. As shown in FIG. 2, the server comprises at least one communication interface for communicating with components of the system 100.

Figure 3:
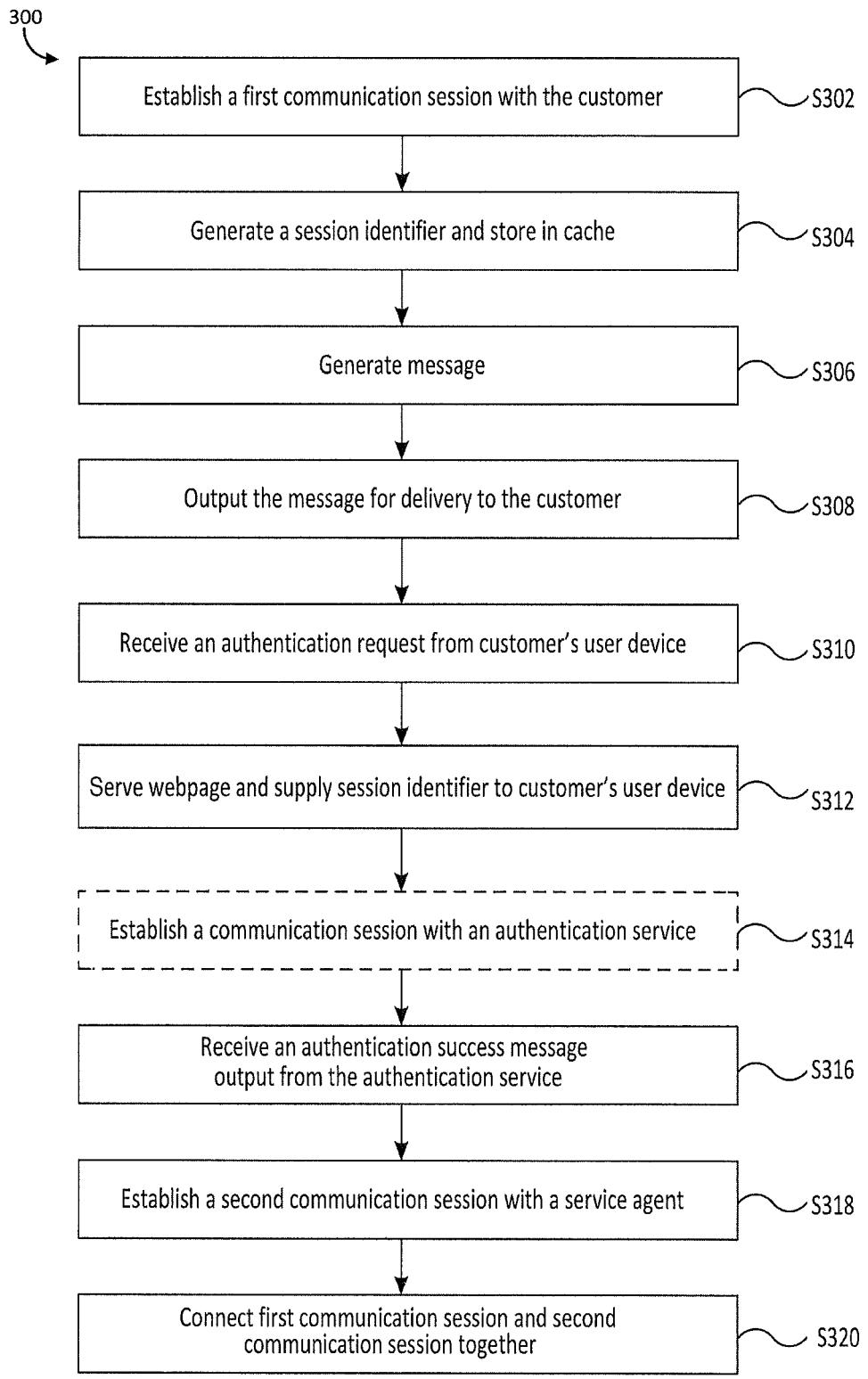
FIG. 3 is a flowchart of a process performed by components of a secure data platform in the system of FIG. 1.

FIG. 3 is a flowchart of a process 300 performed by components of the secure data platform 120.

The steps shown separately in FIG. 3 may or may not be implemented as separate steps, and may or may not be implemented in the order shown.

At step, S302 the telephony server 122 establishes a first communication session with the customer 142. For example, the customer 142 places a call to the contact center 110 using their communications device 144 which gets directed over the communications channel 182 to the telephony server 122 on the secure data platform 120. The telephony server 122 answers the call and is connected to the communications device 144. The establishment of the first communication session may be initiated by the communications device 144 or by the telephony server 122.

The telephony server 122 then determines a unique identifier associated with the first communication session. This unique identifier uniquely identifies the call session in progress with customer 142. It will be appreciated that this unique identifier can take various forms including:
 A telephony session identifier; as is known in the art a telephony session identifier is assigned by the telephony hardware (e.g. the telephony server 122) to the first communication session which persists for the lifetime of the call;
 A timestamp indicating when the first communication session was established;
 A phone number of the customer's communications device 144;
 A channel number; the telephony server 122 may provide a fixed number of telephone lines (e.g. 5000) each associated with a channel number (1-5000) and the unique identifier may be the channel number (e.g. 3000) of the telephone line used to establish the first communication session.

It will be appreciated that the above are merely examples of the unique identifier and embodiments extend to any other identifier that is able to uniquely identify the first communication session.

The telephony server 122 notifies the data server 126 of the establishment of the first communication session.

In response to the notification, at step S304 the data server 126 generates a (sequential or random) session identifier (e.g. 1234). Note that the session identifier generated at step S304 is different to the unique identifier referred to above. The session identifier is stored in the data cache 128 in association with the unique identifier which uniquely identifies the first communication session. The session identifier may additionally be stored in the data cache 128 along with any other relevant data e.g. reference to the merchant called by customer 142.

At step S306, the data server 126 generates a message which will be sent to the customer. The content of the message may be constructed with reference to templates or configuration settings retrieved from the data cache 128. The data cache 128 may contain data related to the customer 142, the merchant on whose behalf the secure data platform is providing a service, and other information including the session identifier. The content of the completed message contains at least a link to a URL at which an authentication request can be made (and which will be served by the data server 126) and the session identifier generated at step S304. The URL may include the session identifier e.g. the URL may be:
merchant.securedataplatform.com/authenticate.php?id=1234, whereby the session identifier is 1234.

In embodiments described above, the message information may comprise a complete reference to an address at which an authentication request can be made, including the unique session identifier generated at step S304, or it may contain a reference to some or all of the required authentication request information. For example, a URL shortening service may be used to simplify or reduce the information sent to the customer. Instead of directing the customer to website merchant.securedataplatform.com/authenticate.php?id=1234, the message link may direct the customer to tinyurl.com/884. The 'tiny URL' service then resolves the full address on behalf of the customer, whose data entry requirements are substantially reduced.

At step S308, the data server 126 instructs the communication server 124 or the telephony server 122 to output the message generated at step S306 for delivery to the customer 142.

The communication server 124 is operable to send a communication via a communication channel (e.g. communication channel 184) to a computing device in the customer environment 140 which is associated with customer 142 e.g. the customer communications device 144 or computing device 148. The communication server 124 may be configured to send one or more of a plurality of known types of communication to the customer e.g. a SMS message, email or instant message (IM) etc. Whilst FIG. 1 shows the communication server 124 as being external to both data server 126 and telephone server 122, it will be appreciated that the functionality of the communication server 124 may be implemented as a module on the data server 126 or telephony server 122. The communication server 124 may operate inside or outside the secure data platform 120.

In an embodiment, the communication server 124 may output the message, at step S308, to the communications device 144 using a device identifier (e.g. phone number) of the communications device 144. For example, the communication server 124 may send an SMS message to the communications device 144.

In an embodiment, the telephony server 122 may be configured to detect the calling line identification (CLI) or other similar identifier of the customer's communications device 144. It will be appreciated that it may not be possible for the telephony server 122 to detect such an identifier of the customer's communications device 144 if the customer has barred/blocked their caller ID. In this scenario, the telephony server 122 may be configured to speak a message asking the customer 142 to speak or type (using the keypad on device 144) an address to which a message can be sent. Such address may be the mobile phone number of the customer's mobile phone (which may be the customer's communications device 144 or a separate device), the customer's email address or IM Chat address, or other similar identifier. Similarly, if the customer 142 is using a desk phone (with no SMS capability) to call the telephony server 122, the telephony server 122 may request a mobile phone number of the customer 142 to which an SMS message can be sent.

In an embodiment, the communication server 124 may output the message, at step S308, not direct to the communications device 144, but via another route for onwards transmission. For example, the communication server 124 may send the message to an authentication server 152, operated by a preferred authentication provider 150. Using such a process, a customer 142 who has previously been authenticated by an authentication provider 150 for access to the contact center 110 may phone the contact center. The caller may be confirmed or detected as a repeat caller (for example via their CLI, or by DTMF entry of an account number). The communication server 124 may then send the message to the previously-chosen authentication provider 150, who prompts the caller 142 to authenticate using (say) an authentication app on communications device 144. Such prompt may come in the form of a 'push' notification, or another message from the authentication provider 150 to the customer 142 or the customer's communications device 144. In this way, the communication server 124 does not need to send a message directly to the communications device 144.

In other embodiments, the communication server 124 outputs the message, at step S308, using a device identifier of a further computing device associated with the customer 142 that is different to the computing device 148 executing customer browser 146. For example, in system 100, the communication server 124 may output the message using a device identifier (e.g. phone number) of the communications device 144 and transmit the message via an SMS message to the communications device 144. Alternatively, the communication server 124 may output the message using a device identifier of a further computing device associated with the user 142 not shown in FIG. 1. For example, the message may be sent via an IP message to the customer's home 'smart assistant' such as their Amazon Alexa® or Google Home™ device using the IP address of such a device, which may audibly output the message to the customer 142.

In alternative embodiments, a user identifier of the customer 142 may be used by the communication server 124 to output the message at step S308. The user identifier of the customer 142 may take many forms. For example, the communication server 124 may output an email comprising the message to an email address of the customer 142. Alternatively, the communication server 124 may output an IM chat message comprising the message to an IM username of the customer 142. Alternatively, the communication server 124 may output the message to an authentication provider 150, referencing a user ID or account number, which is unique to the customer 142 and is held by the authentication provider 150—in this scenario the message is then transmitted to the customer 142 via the authentication provider 150.

It will be appreciated that the customer 142 may use any computing device to receive such communications, such as the computing device 148 or a further computing device (e.g. the communications device 144 in environment 140). Whilst FIG. 1 illustrates that the message may be received by computing device 148, in other embodiments the communication transmitted from the communication server 124 may be received on the communications device 144, on a further computing device not shown in FIG. 1, or received by the customer 142 using a channel not shown in FIG. 1, for entry into customer browser 146.

In a further embodiment, the message is sent at step S308 to the customer's communications device 144, by the telephony server 122, via channel 182.

In embodiments, the customer 142 may hear the message. For example, the telephony server 122 may communicate the message to the customer 142 by any known communication method such as over a phone call (for example, directing a customer to a third party referral website with verbal instructions such as "Please go to www.tinyurl.com and enter the code 1234"), in an email, in an IM message etc. The message may then be entered into the customer browser 146 by the customer 142. As noted herein the customer browser 146 may be running on the communications device 144 or if the customer 142 uses multiple devices the customer browser may be running on computing device 148.

The message also could be received into the customer's communication device 144 through its microphone using an alternate communications format. For example, in system 100, the format of the communication to the customer browser 146 could comprise audio which contains or embeds the message information in an encoded or steganographic format. Such audio may be transmitted over a telephone call. The customer 142, calling from an office desk phone (e.g. communications device 144), is on a telephone call with telephony server 122. The telephony server 122 plays audio directly to the customer's office desk telephone 144. The customer 142 places the desk phone into 'speaker' mode, such that a microphone of the computing device 148 can hear the server-generated audio. The computing device 148 detects and decodes the message and enters the URL into to the customer browser 146.

Using the information in the message transmitted from the communication server 124 or telephony server 122, the customer 142 uses the customer's browser 146 (shown in FIG. 1, as an example, as being executed on computing device 148) to browse to the URL using connection 186.

The message may be in text form suitable for the customer to read the message and enter it into the customer browser 146 using any of the techniques discussed above.

In embodiments, there may be different methods used by the customer 142 to enter the URL which was included in the received message, into customer browser 146.

The customer 142 may click on (or otherwise select or activate) the unique customer authentication request link. The customer may type the required message into their customer browser 146 on computing device 148 using an internal or external keyboard of the computing device 148, or may enter such information verbally through a microphone of the computing device 148. Alternatively, the customer may utilise a third-party service or application to communicate the message, such as by speaking to a speech recognition service which facilitates entry.

The message also could be received into the customer's communication device through its microphone using an alternate communications format. For example, in system 100, the format of the communication to the customer browser 146 could comprise audio which contains or embeds the message information in an encoded or steganographic format. Such audio may be transmitted over a telephone call. The customer 142, calling from an office desk phone (e.g. communications device 144), is on a telephone call with telephony server 122. The telephony server 122 plays audio directly to the customer's office desk telephone 144. The customer 142 places the desk phone into 'speaker' mode, such that a microphone of the computing device 148 can hear the server-generated audio. The computing device 148 detects and decodes the message and enters the URL into the customer browser 146.

The customer 142 launches the URL in customer browser 146 which causes the customer browser 146 to transmit a customer authentication request for an initial web page to be served by the data server 126, over connection 186.

It will be appreciated that the customer's device used to transmit the customer authentication request is not necessarily the same communications device 144 used to conduct the first communication session with the telephony server 122, although it could be.

At step S310, the data server receives the customer authentication request. As the SDP 120 may be hosted on behalf of multiple merchants, on receipt of a customer authentication request, the data server 126 may retrieve relevant information from the data cache 128 associated with the merchant for use in serving the merchant's webpage (this retrieved information may include reference to templates or configuration settings). It may also retrieve relevant information from the data cache 128 that is associated with one or more authentication providers 150 supplied using communications channel 192, for use in displaying an authentication request form in accordance with requirements set by the authentication provider e.g. PayPal®.

At step S312, the data server 126 serves the customer browser 146 an initial web page over connection 186. The initial webpage may include a user selectable element (e.g. an icon, button or link etc.) which when selected causes a request for authentication to be transmitted from the customer browser 146 to the authentication server 152.

Additionally, at step S312 the data server 126 transmits the session identifier to the customer browser 146 causing the customer browser 146 to include the session identifier in communications with the authentication server 152 (as a result, the authentication server includes the session identifier in communications sent to the customer browser 146). This may be transmitted in the same, or a different message to the message(s) serving the initial webpage.

At optional step S314 the data server 126 establishes a communication session (also referred to herein as a third communication session), over communications channel 192, with the authentication server 152. Communications channel 192 may be established during construction and serving of the authentication request webpage to customer 142 (during steps S310 and S312). Alternatively, communications channel 192 may be established specifically to request or share data relating to the customer 142. The establishment of communications channel 192 may be initiated by the data server 126 or by the authentication server 152, or indirectly by request from the customer browser 146, or by other servers not shown in FIG. 1.

The customer browser 146, on loading the webpage for display to the customer 142, may request information to be served by one or more authentication servers 152 at one or more authentication providers 150, over channel 188.

The customer 142 completes an authentication process by interacting with a preferred authentication server 152. As noted above, the customer browser 146 provides the session identifier to the authentication server during the authentication process. This authentication process may be triggered by the customer selecting the user selectable element referred to above which when selected causes a request for authentication to be transmitted from the customer browser 146 to the authentication server 152, thus initiating the authentication process. The authentication process may take many different forms which are outside of the scope of the present disclosure, and may involve multiple communications between the authentication server 152 and the customer browser 148 over channel 188. It may further involve multiple 'out of band' communications between the authentication server 152 and the customer 142 over channel 190.

Following successful authentication of the customer 142 by the authentication server 152, at step S316 the data server 126 receives an authentication success message indicating successful authentication. The authentication success message is output by the authentication server 152. The authentication success message includes the session identifier. The authentication success message may be received from the customer's device running customer browser 146, or via another route e.g. directly from the authentication server 152. For example, following successful authentication of the customer over channel 188, the authentication server 152 may provide the customer's mobile device 144 running customer browser 146 with an 'authentication success' message in the form of an authorisation code which is passed on to the data server 126. Such passing of the authorisation code may be effected by, for example, client-side JavaScript operating on the customers' mobile device 144, or by an HTTP redirect of the customer browser 146 to a URL served by the data server 126, where the authorisation code is a fragment identifier of the URL. In this way, for this element of the process at least, there need not be direct communication between the authentication server 152 and the data server 126.

In an embodiment, the authentication server 152 may implement the W3C WebAuthn authentication functionality, as detailed at https://www.w3.org/TR/webauthn/. In this way, the customer 142 may be authenticated through the use of so-called "Authenticators".

As defined by the WebAuthn process, an Authenticator is a cryptographic entity used by a "WebAuthn Client" (in an embodiment, the mobile device 144 or browser 146 or similar device associated with the customer 142) to (i) generate a public key credential and register it with a "Relying Party" (in an embodiment, the authentication server 152), and (ii) authenticate by potentially verifying the user (in an embodiment, the customer 142).

In an embodiment, therefore, the customer 142 may utilise an Authenticator in the form of, for example, a biometric detection device operating within, connected to, or associated with mobile device 144 or browser 146, and register or authenticate with the authentication server 152.

Examples of biometric authentication methods may include, but are not limited to, speech or voice recognition, fingerprint recognition, face recognition, iris detection, etc.

Hence in one embodiment, a customer 142 who has previously authenticated access to the contact center 110 by using, for example, facial recognition, may phone the contact center, and be prompted by the browser 146 on their mobile device 144 to hold the device in front of their face. The browser 146, a WebAuthn Client, accesses the facial recognition Authenticator on the mobile device 144. The Authenticator detects and determines that the customer's face is a correct match, and (through the WebAuthn protocol), passes the positive match to the authentication server 152. Thus, the customer is authenticated to access the contact center 110, in part by holding their mobile phone to their face.

Such approaches are outlined for the WebAuthn authentication process, but a person skilled in the art will understand that similar approaches are possible for other types of authentication, including those described by the FIDO (Fast IDentity Online) Alliance.

In another embodiment, the first time the customer 142 is authenticated by the authentication server 152, the data server 126 may store authentication-related data in the data cache 128. Such information may include the customer's caller line identification (CLI), and other data associated with the authentication method chosen.

Then, if the customer 142 calls the contact center 110 a second or subsequent time, the telephony server 122 may detect the caller's CLI. The data server 126 may then retrieve data related to original authentication from the data cache 128, and prompt an authentication of the customer 142 using the authentication process via authentication server 152. Such authentication may be direct to the customer's mobile device 144, browser 146, or similar associated device (not shown in FIG. 1), since such device may have been "registered" as part of the initial authentication.

Such an approach therefore may remove the requirement, on second or subsequent calls, for a caller 142 to receive an authentication request message and to click on a URL at which an authentication request can be made, and thus may substantially simplify the authentication process.

In one embodiment, on successful completion of the authentication process, the customer 142 authorizes the authentication provider 150 to share personal data it has relating to the customer 142 with the secure data platform 120, through communications channel 192.

For example, the customer may authorize the sharing of their billing or home address, so the merchant can bill or ship a product without the customer having to verbalise the address to the contact center agent. Thus, this may advantageously enable the duration of the call with the contact center agent to be reduced.

Sharing or collecting personal data related to the customer may require additional communication steps between the data server 126 and the authentication server(s) 152.

For example, an authentication server 150 may return a data sharing token to the customer's mobile device 144, the token being passed on to the data server 126 over channel 186. The data sharing token may then be sent to an authentication server 152 by the data server 126 in a request for personal data associated with customer 142, and personal data related to the customer 142 returned in exchange.

Upon receipt of personal data related to the customer 142 from the authentication server 152, the data server 126 may supply the personal data to the merchant CRM server 162.

Alternatively or additionally, personal data authorized for sharing by the customer 142 may be included in the authentication success message indicating successful authentication of the customer.

Upon receiving the authentication success message, the data server 126 extracts the session identifier from the authentication success message and queries the data cache 128 for communication session information associated with the session identifier. As noted above with reference to step S304, the session identifier has been previously stored in the data cache 128 in association with a unique identifier associated with the first communication session. Upon detecting a session identifier/unique identifier match, the data server 126 knows which communication session to connect with a service agent 118 and thus then takes steps to connect the first communication session (and thus the communications device 144), with a service agent 118 in the contact center 110.

At step S318, the data server 126 controls the telephony server 122 to establish a second communication session with a service agent 118. The telephony server 122 establishes a communication session via communication channel 180 to a service agent 118 in a contact center 110. Typically, the communication session will be a call over a PSTN network, cellular network, and/or a packet based network (e.g. the Internet) in the case of a Voice over Internet Protocol (VOIP) call. However, it can be any type of communication session.

In another embodiment, the communication session from the telephony server 122 to a service agent 118 may be a call established in advance. In some contact center operations, a single call between a telephony platform and an agent 118 is kept open throughout the agent's shift, with individual customer calls being switched to/from the agent. That is, step S318 is not necessarily performed responsive to the data server 126 receiving the authentication success message, although it could be.

In another embodiment, a queuing process may be affected between the caller 142 and the service agent 118, and operated by the secure data platform 120 or elsewhere (not shown in FIG. 1). Queuing may enable a single service agent 118 to serve multiple customers 142. Such queuing may operate as 'first come first served', or by any other logic or principles so desired, such as acting to prioritise some types of calls or callers over others.

When the service agent 118 accepts the communication session 180 from the telephony server 122, the telephony server 122 may play an audio prompt to the agent 118 which uniquely identifies the customer data stored in the merchant CRM server 162.

Alternatively, the data server 126 may also send this information directly to the CTI application 197 running on the agent computer 114, via the separate CTI link 198 established in advance.

At step S320, the telephony server connects the first communication session and the second communication session together. Using CTI or other similar signalling, the service agent 118 may interact with a user interface provided by the CTI application 197 to instruct, via CTI link 199, the telephony server 122 to connect the customer 142 to the agent phone 116 by connecting communication channels 182 and 180. Alternatively, the telephony server 122 may automatically connect the customer to the service agent phone 116 (in response to instruction from the data server 126), without agent interaction.

In this way, the customer 142 has authenticated themselves with an authentication provider 150, prior to the call being connected to the agent 118.

In an embodiment, prior to or concurrent with connecting the customer 142 and the service agent 118 at step S320, the data server 126 may send the customer data received from the authentication server 152 to the merchant CRM server 162 at the merchant data center 160, via channel 194.

In this way, the merchant CRM server can create a new customer account, using data provided by the authentication provider 150. Alternatively, existing account data may be updated or appended or otherwise referenced.

Such an approach allows the merchant to create or update a customer account without asking the customer for such information verbally. This may have the effect of reducing the call handling time, with associated saving in both telephony and agent costs.

In addition, the accuracy of customer information received from the authentication provider 150 will typically be better than that interpreted verbally by the call center service agent 118. This is because the customer information has been entered or otherwise provided directly by the customer on a previous occasion during separate contact with the authentication provider 150. It is in the customer's best interests to ensure the accuracy of such information, such as their home address, because otherwise orders or purchases from merchants using such authentication service 150 will go astray or not be billed correctly, leading to loss of service.

Further, the authentication provider 150 may also offer means of taking payment for the merchant's products or services. Indeed, the authentication provider 150 may have successfully taken payments from the customer for other merchants in the past, either for telephone orders, or for orders in other channels such as ecommerce. In this case, the merchant may be assured of lower fraud rates from its customers, because the authentication provider 150 may deny or restrict authentication or transaction requests from those it suspects of potential fraud. It may share such restrictions, or data relating to such, with the merchant. The merchant may therefore be able to identify suspected fraudsters prior to connection to a service agent, or prior to a subsequent transaction.

The authentication provider 150 may also use fraud detection or authentication methods otherwise unavailable to the merchant on a typical telephone conversation, thus giving the merchant higher confidence that the customer's identity is genuine.

In an embodiment described above where the data server 126 passes customer data to the merchant CRM server 162, the agent 118 may access the customer data on the merchant CRM server 162 through connection 196. The data server 126 may push customer information retrieved from the merchant CRM server 162 at crm.merchant.com to the agent browser 112.

In an embodiment, following authentication of the customer 142 with the authentication provider 150, connection 186 between the data server 126 and customer browser 146 may be terminated.

In another embodiment, connection 186 may be maintained for any length of time after authentication is complete. Connection 186 may be maintained even after the call via connection 182 has been terminated.

In this case, the data server 126 may display information to the customer 142 through the customer browser 146. Such information may relate to call progress (showing the customer's position in a queue), merchant products or services (thus allowing the customer to view relevant advertisements), or for any other reason. The customer may, for example, be able to see live order progress or status updates even after the call via connection 182 has been terminated.

If connection 186 is maintained after authentication, additional functionality may also be offered to the customer, such as so-called 'visual IVR' services, which may allow the customer to click buttons in the customer browser 146 to navigate or progress through a merchant's call handling or IVR menu. Such additional functionality may also incorporate order summaries, payment confirmation pages, or be used for any other information-gathering or display purpose.

Figure 4A:
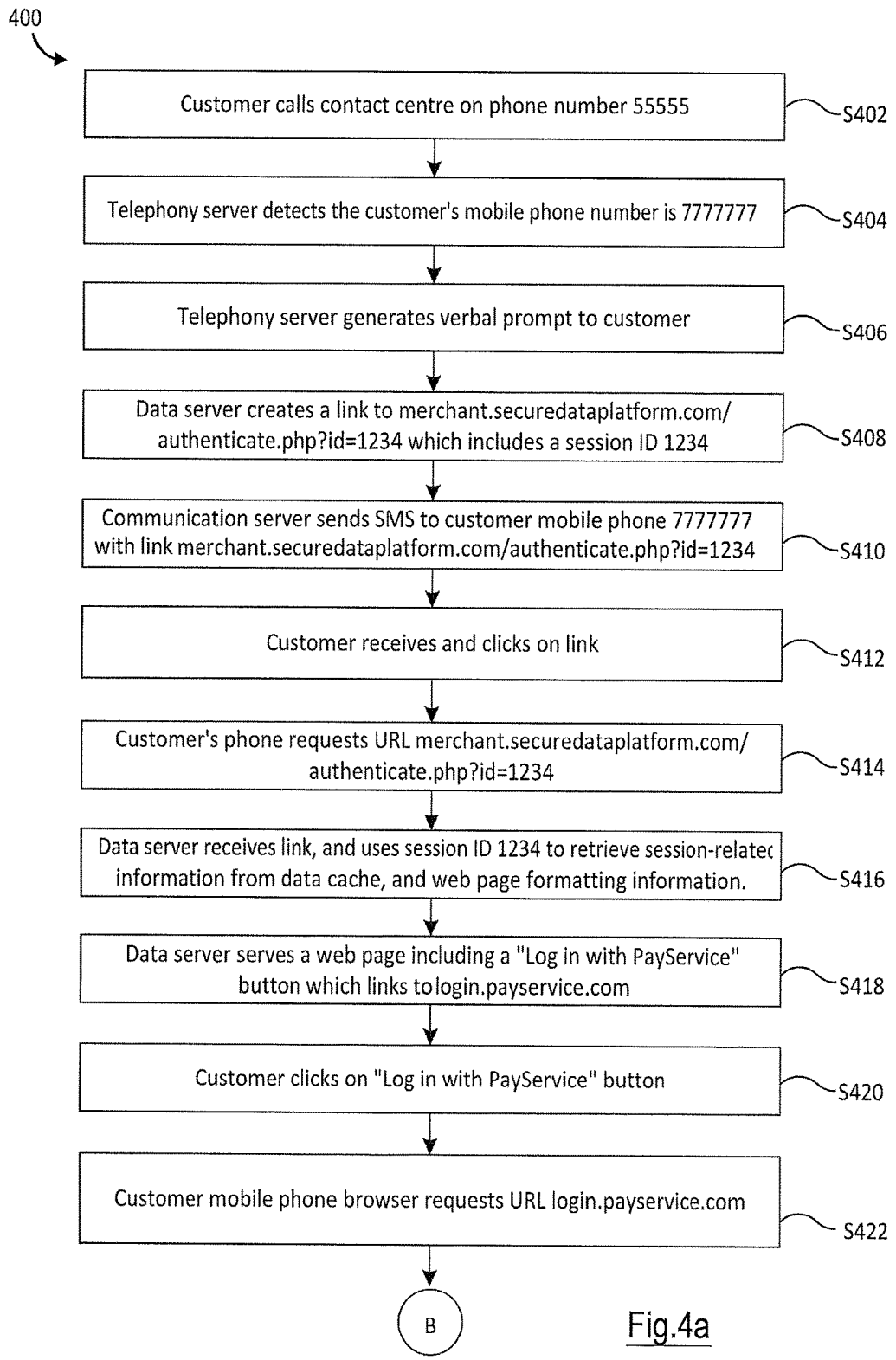
FIGS. 4a and 4b illustrate a flowchart of a method performed by components in the system of FIG. 1.
Figure 4B:
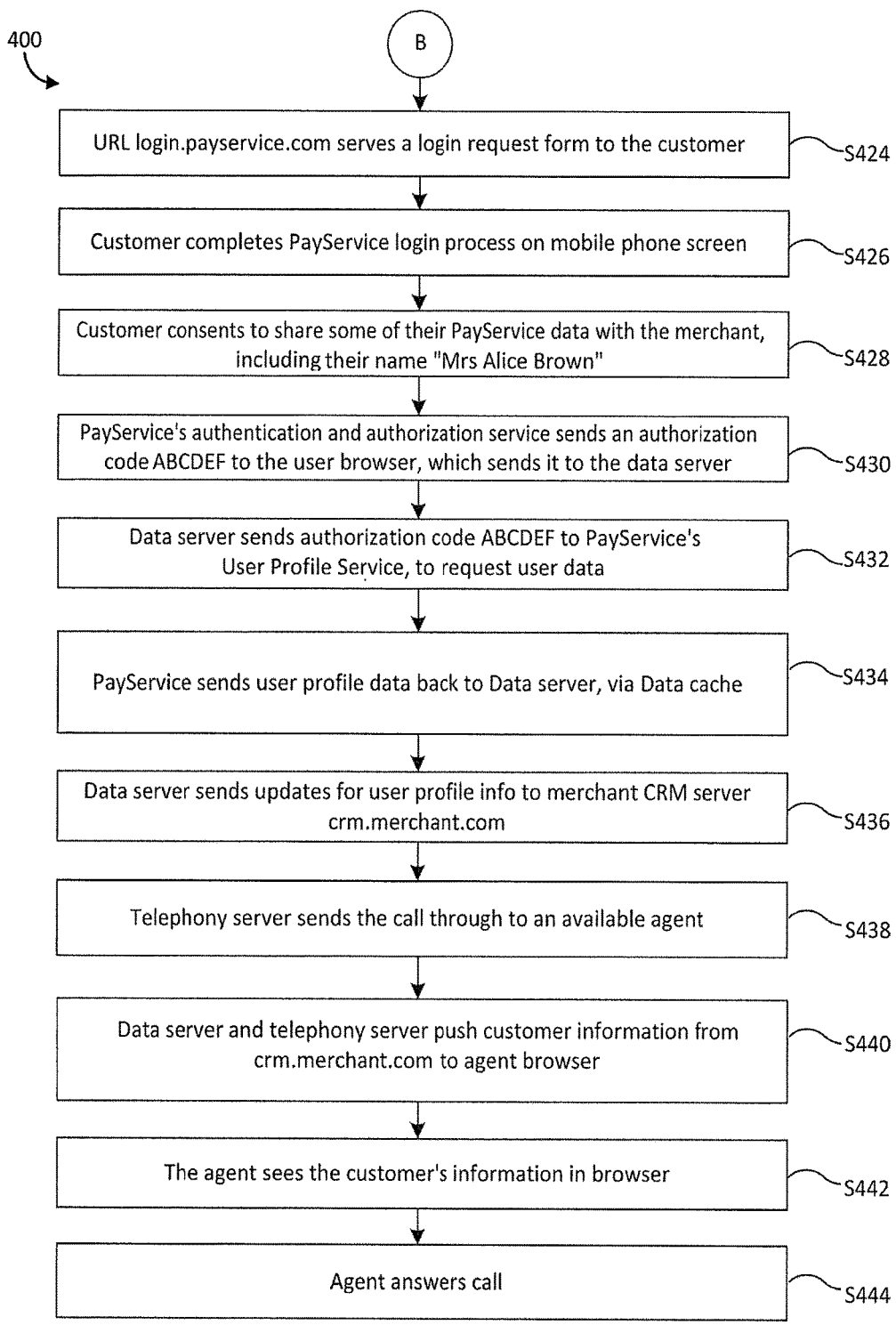

FIG. 4 shows an example process flow for an embodiment in the system 100 shown in FIG. 1, in which a customer 142 wishes to talk with a merchant which operates a contact center 110.

At step 400, the customer 142 uses a smart mobile phone 144 to call 55555, the phone number allocated to the merchant's contact center 110. The call passes through telephony server 122 in the Secure Data Platform 120.

At step 402, the telephony server 122 detects the customer's mobile phone number is 7777777. The telephony server 122 determines a unique identifier associated with the call, this unique identifier may be the customer's mobile phone number or an alternative identifier.

At step 404, the telephony server 122 generates a verbal prompt, which it speaks to the customer 142. The customer hears "Hello, we see your mobile is 7777777—we'll send you a link to aid your login."

At step 406, the data server 126 creates a link to a URL of merchant.securedataplatform.com/authenticate.php?id=1234. The URL includes a session ID 1234. The data server 126 stores relevant session-related information (the session ID 1234 and the unique identifier) in the data cache 128.

At step 408, the communication server 124 sends an SMS message to the customer's mobile phone 142 (on number 7777777), the SMS message containing the link merchant.securedataplatform.com/authenticate.php?id=1234.

At step 410, the customer's mobile phone 144 receives the SMS message, the customer reads it, and clicks on the link.

At step 412, the browser 146 in the customer's phone 144 requests URL merchant.securedataplatform.com/authenticate.php?id=1234.

At step 414, the data server 126 receives the authentication request to serve the URL. It parses the URL to retrieve the session ID 1234, and uses this to retrieve session-related information from the data cache 128. It also retrieves information relating to the way in which the merchant wishes to format a web page to be displayed to the customer, such as style information and graphical devices such as logos. It also retrieves information relating to the merchant's preferred authentication service partner, PayService.

At step 416, the data server 126 constructs and serves a web page formatted for the customer's mobile browser 146, including a user selectable element e.g. a "Log in with PayService" button which links to login.payservice.com. Here login.payservice.com is an example address at which a request for authentication by an authentication service can be directed.

At step 418, the customer 142 reads the webpage in browser 146, and clicks on the "Log in with PayService" button.

At step 420, the customer mobile phone browser 146 requests URL login.payservice.com.

At step 422, after receiving the customer's login request, the server 152 at login.payservice.com serves a login request form to the customer 142.

At step 424, the customer 142 completes the PayService login process on the mobile browser 146. The PayService process may further ask the customer whether they wish to share some of their existing PayService data (such as name and billing address) with the merchant.

At step 426, the customer may consent to share some of their PayService data with the merchant, including their name "Mrs Alice Brown".

At step 428, upon successful authentication of the customer, PayService's authentication server 152 sends an authorization code ABCDEF to the user's browser 146, which (using client-side scripting) sends it to the data server 126. As noted above, the authorization code is sent from the authentication server 152 together with the session identifier. The authorization code may convey the user's consent to share their PayService data, alternatively a separate data sharing token may be issued by the authentication server 152 and sent to the user's browser 146.

At step 430, the data server 126 may send the authorization code ABCDEF (or the data sharing token) to PayService's User Profile Service 152, to request the user data.

At step 432, PayService sends user profile data back to the data server 126, via the data cache 128.

At step 434, the data server 126 sends user profile data to merchant CRM server crm.merchant.com 162.

At step 436, the telephony server 122 sends the customer call through to an available agent 118. In particular, upon receiving the authorization code and session identifier, the data server 126 queries the data cache 128 for the unique identifier associated with the call that was previously stored in association with the session identifier. and controls the telephony server 122 to connect the call with a service agent 118 in the contact center 110.

At step 438, the data server 126 pushes customer information retrieved from the merchant CRM server 162 at crm.merchant.com to the agent browser 112, using CTI commands.

At step 440, the agent 118 sees the customer's information in browser 112.

At step 442, the agent 118 answers the call e.g. "Good morning Mrs Brown. You've been authenticated, and I can help you with your purchase."

It will be appreciated from the above that FIG. 4 illustrates just one example of how the process flow may be implemented in embodiments of the present disclosure.

The described embodiments can be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment limits future implementation of the invention on yet to be discovered or defined means of execution.

The invention has been described above with reference to specific embodiments. Persons skilled in the art, however, will understand that various modifications and changes may be made thereto without departing from the broader scope of the invention as set forth in the appended claims. The foregoing description and drawings are, accordingly, to be regarded in an illustrative rather than a restrictive sense.

The invention claimed is:

1. A method of authenticating a user and connecting the authenticated user to a service agent, the method comprising, at at least one server:

establishing a first communication session with the user;
determining a unique identifier associated with the first communication session;
generating a session identifier to identify said first communication session and storing said session identifier in a data cache coupled to said server in association with the unique identifier;
outputting an address and the session identifier, for delivery to the user;
receiving an authentication request transmitted to said address from a first computing device associated with said user, and in response, outputting at least one message to the first computing device, the at least one message comprising the session identifier and an address at which a request for authentication by an authentication service can be directed;
receiving an authentication success message comprising the session identifier, the authentication success message indicating successful authentication of the user with the authentication service, said authentication success message output by the authentication service;
establishing a second communication session with a service agent; and
in response to receiving the authentication success message indicating successful authentication of the user, querying the data cache with the session identifier to determine the unique identifier associated with the first communication session, and connecting the first communication session and the second communication session together using the unique identifier associated with the first communication session.

2. The method of claim 1, wherein the first communication session is established with the first computing device.

3. The method of claim 2, wherein the address and session identifier are output using a device identifier to the first computing device or a further computing device associated with the user.

4. The method of claim 3, wherein the device identifier is associated with the first computing device, the method further comprising automatically detecting the device identifier during the first communication session.

5. The method of claim 1, wherein the first communication session is established with a communications device associated with the user.

6. The method of claim 5, wherein the address and session identifier are output using a device identifier to the first computing device, the communications device associated with the user, or a further computing device associated with the user.

7. The method of claim 6, further comprising outputting a message requesting said device identifier during the first communication session and receiving the device identifier in reply, from the user, during the first communication session.

8. The method of claim 1, wherein the address and the session identifier are output to the user via a communication channel associated with the first communications session.

9. The method of claim 1, wherein the address and session identifier are output using a user identifier of the user.

10. The method of claim 9, further comprising outputting a message requesting said user identifier during the first communication session and receiving the user identifier in reply, from the user, during the first communication session.

11. The method of claim 1, wherein the unique identifier is one of:

(i) a telephony session identifier assigned to the first communication session; (ii) timestamp indicating when the first communication session was established; (iii) a phone number associated with the user; and (iv) a channel number of a telephone line used to establish the first communication session, wherein the telephone line is one of a plurality of telephone lines provided by the at least one server.

12. The method of claim 1, wherein the authentication success message is received from (i) the first computing device, or (ii) the authentication service.

13. The method of claim 1, wherein the service agent is a contact center agent or an interactive voice response system.

14. The method of claim 1, wherein said outputting at least one message to the first computing device comprises serving a webpage to the first computing device, wherein said webpage includes a user selectable element which when selected causes a request for authentication to be transmitted from the first computing device to the authentication service.

15. The method of claim 1, wherein the authentication success message additionally comprises user information associated with the user.

16. The method of claim 1, further comprising establishing a third communication session with the authentication service, and during the third communication session: transmitting a request for user information associated with said user to the authentication service, and in reply receiving user information associated with said user.

17. The method of claim 15, further comprising outputting the user information to a server associated with a merchant.

18. The method of claim 17, the method further comprising, in response to said connecting, retrieving user information associated with the user from said server and supplying the retrieved user information to the service agent.

19. The method of claim 1, wherein the first communication session is a voice call, and the second communication session comprises a voice call.

20. A computer program product for authenticating a user and connecting the authenticated user to a service agent, the computer program product comprising instructions embodied on a non-transient computer-readable medium and configured so as when executed on a processor of at least one server to perform the method of claim 1.

21. A server for authenticating a user and connecting the authenticated user to a service agent, the server comprising a processing apparatus configured to:
    establish a first communication session with the user;
    determine a unique identifier associated with the first communication session;
    generate a session identifier to identify said first communication session and storing said session identifier in a data cache coupled to said server in association with the unique identifier;
    output an address and the session identifier, for delivery to the user;
    receive an authentication request transmitted to said address from a first computing device associated with said user, and in response, outputting at least one message to the first computing device, the at least one message comprising the session identifier and an address at which a request for authentication by an authentication service can be directed;
    receive an authentication success message comprising the session identifier, the authentication success message indicating successful authentication of the user with the authentication service, said authentication success message output by the authentication service;
    establish a second communication session with a service agent; and
    in response to receiving the authentication success message indicating successful authentication of the user, query the data cache with the session identifier to determine the unique identifier associated with the first communication session and connect the first communication session and the second communication session together using the unique identifier associated with the first communication session.

\* \* \* \* \*